United States Patent
Heinonen, Jr.

[15] 3,656,841
[45] Apr. 18, 1972

[54] CINEMATOGRAPHIC CAMERA WITH QUICK-CONVERT COLOR-ENCODING FILTER

[72] Inventor: Russell M. Heinonen, Jr., Hudson, Mass.

[73] Assignee: Technical Operations Incorporated, Burlington, Mass.

[22] Filed: Apr. 3, 1970

[21] Appl. No.: 25,404

[52] U.S. Cl. .............................................. 352/45, 350/315
[51] Int. Cl. ................................. G03b 19/18, G02b 5/22
[58] Field of Search ................. 352/66, 67, 45, 42; 350/315, 350/318

[56] References Cited

UNITED STATES PATENTS

| | | | |
|---|---|---|---|
| 2,205,179 | 6/1940 | Schultz | 350/315 |
| 1,958,618 | 5/1934 | Gilmore | 352/67 |
| 3,479,114 | 11/1969 | Heinonen, Jr. | 352/45 X |

*Primary Examiner*—S. Clement Swisher
*Assistant Examiner*—Joseph W. Roskos
*Attorney*—Rosen & Steinhilper

[57] ABSTRACT

This disclosure depicts a number of cine cameras illustrating principles, uses, implementations, and modes of operation of the invention. Each disclosed embodiment includes a removable holder for supporting two alternatively operative light-affecting elements. At least one of the elements is a spectral zonal filter for encoding color information such that it may be recorded on black-and-white recording materials. In the illustrated preferred embodiments the other element constitutes a neutral glass slip having substantially the same optical retardation as the color-encoding filter. A guide structure is provided for guiding the holder through the camera housing from a withdrawn position to an inserted position wherein one of the light-affecting elements is in an operative position on the optical axis. The holder is designed such that it may be quickly withdrawn from the camera, altered in orientation, and reinserted into the camera to convert between conventional black-and-white photography wherein the neutral element is on axis and nonconventional color storage black-and-white photography wherein the color encoding filter is on axis.

11 Claims, 8 Drawing Figures

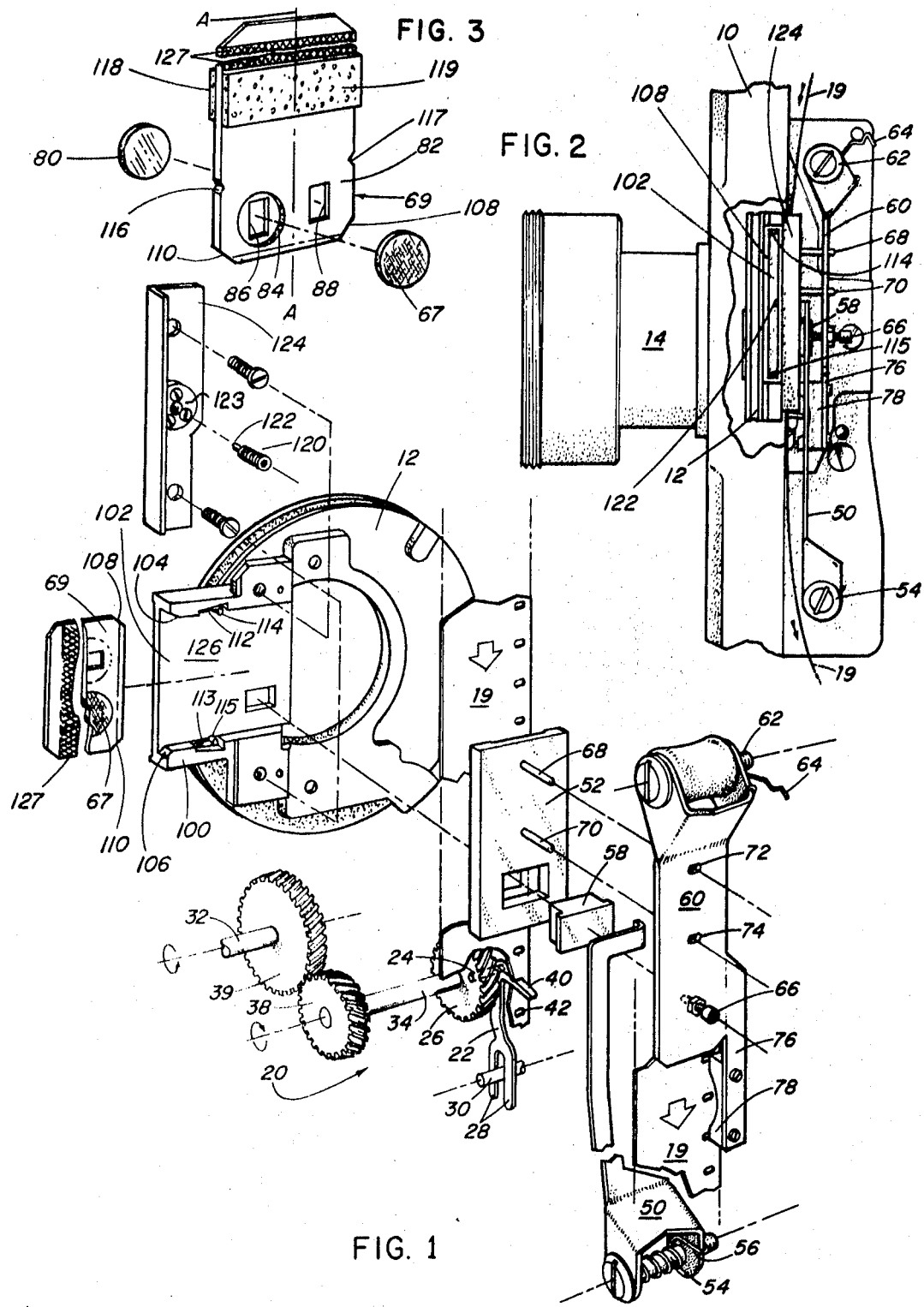

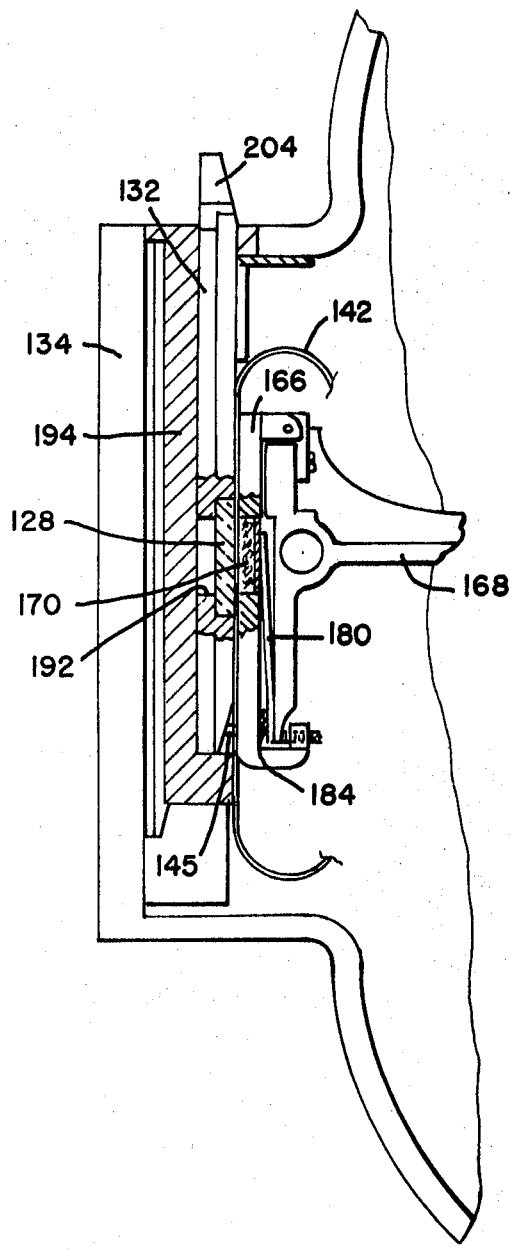

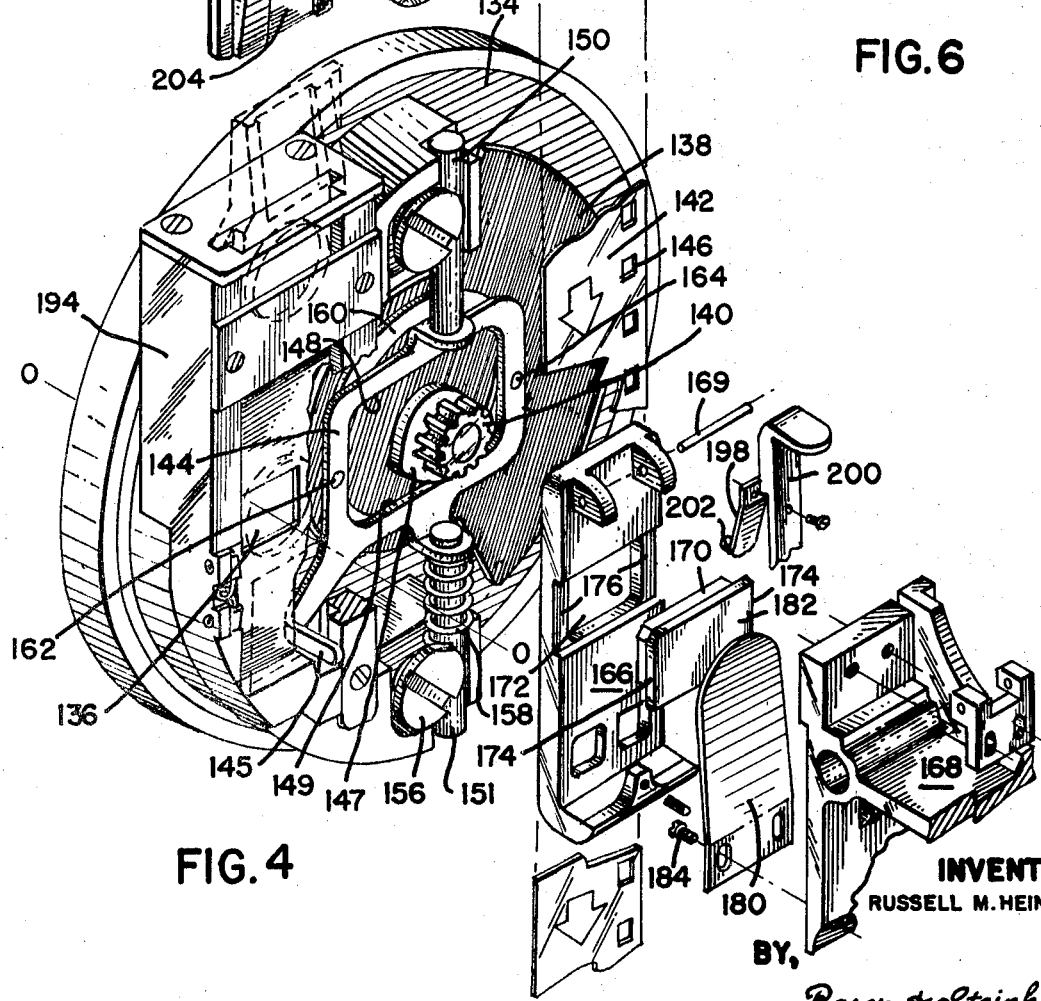

CINEMATOGRAPHIC CAMERA WITH QUICK-CONVERT COLOR-ENCODING FILTER

CROSS-REFERENCE TO RELATED APPLICATIONS

This application relates to application Ser. No. 25,474, filed Apr. 3, 1970 assigned to the assignee of the present invention.

BACKGROUND OF THE INVENTION

A method of color photography has been developed which utilizes black-and-white film materials and a special color encoding filter to encode the color information such that it may be stored on black-and-white film materials. This special filter is preferably supported at the film gate of recording cameras immediately in front of the film exposure area. In cine cameras means are preferably provided for pressing the film into firm and intimate contact with the rear surface of the filter during exposure of the film. Such pressure-inducing means are shown and claimed in my U.S. No. 3,479,114 and in the above-noted application, both of which are assigned to the assignee of the present invention.

One method for mounting such a filter is through the front of the camera which, in most camera designs, necessitates removing the lens assembly and gaining access to the filter location through the shutter mechanism. Further, it is desirable to frequently remove and clean the filter, causing a substantial inconvenience to a photographer operating in the field. Yet another factor must be considered — to convert between conventional and color-storage photographic modes in the field, a photographer must remove the filter without damage to the shutter and must then readjust the focus of the optical system to account for the shift in the focal plane caused by removal of the filter. These procedures are apt to be extremely burdensome in an operational setting.

OBJECTS OF THE INVENTION

It is an object of this invention to provide compatible cine cameras adapted to perform either conventional or color-storage black-and-white photography.

It is another object to provide a removable holder for such cine cameras for supporting two alternatively operative light-affecting elements, at least one of which is a color-encoding filter. The holder is capable of being quickly and easily removed from the camera, altered in orientation, and reinserted into the camera to bring the previously inoperative light-affecting element into an operative position on the camera optical axis.

It is a further object to provide on such a holder a color-encoding filter element and a neutral element each having substantially the same optical retardation to enable a quick conversion between conventional and color-storage black-and-white photographic modes without requiring refocusing of the objective lens system in the camera.

It is yet another object to provide a holder for a color-encoding filter which enables the filter to be cleaned quickly and easily or replaced by another having preferred characteristics.

It is still another object to provide a holder for a color-encoding filter and structure cooperative therewith for automatically locating the filter in the proper position on the optical axis and for effecting a light and dust seal for the exposure chamber.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein:

FIG. 1 is a partially exploded fragmentary perspective view of a cine camera incorporating one of the many possible implementations of the invention;

FIG. 2 is a side elevational view of the FIG. 1 camera, assembled and partially broken away to show internal components;

FIG. 3 is a perspective view of a holder for light-affecting elements constructed in accordance with the principles of this invention; light-affecting elements carried on the holder are shown exploded away from the holder for clarity of illustration;

FIG. 4 is a partially exploded fragmentary perspective view of another cine camera incorporating another implementation of the invention;

FIG. 5 is a side elevational view of the FIG. 4 camera, assembled and partly broken away to show internal components;

FIG. 6 is an enlarged perspective view of a portion of the FIGS. 4–5 apparatus, shown assembled and partly broken away to reveal detent means for a filter holder; and FIGS. 7 and 8 are back and front perspective views of a novel holder for light-affecting elements; the holder is shown in place in the camera in FIGS. 5 and 6.

DESCRIPTION OF THE PREFERRED EMBODIMENTS

FIGS. 1–3 show a first embodiment of the invention incorporated in a commercially available cine camera. Before engaging in a discussion of the novel subject matter, as background the general structure and operation of the camera will be discussed. The camera is illustrated as comprising a housing 10 mounting a front plate 12 which in turn supports a lens barrel 14. Strip film 19 is transported to the film gate from a supply and storage reel (not shown) by a film advance mechanism 20.

The film advance mechanism 20 provides an intermittent advance of a film strip 19 through the imaging plane. The mechanism 20 includes a claw member 22 eccentrically mounted by a pin 24 on the side face of a worm gear 26. A pair of parallel legs 28 on the claw member 22 define an open-ended slot in which is captured a guide rod 30 anchored on the camera chassis. The worm gear 26 is driven by a drive source (not shown) through shafts 32 and 34, and a set of spur gears 39 and 38. In operation, as the worm gear 26 is driven, a claw 40 on the claw member 22 periodically reaches up and engages one of the perforations 42 in the film strip 19, pulling the film strip 19 down to the succeeding frame. At the bottom of the pull-down stroke, the eccentric motion of the claw member 22 causes the claw 40 to be withdrawn from the engaged perforation, freeing the claw member 22 for recycling to begin the next pull-downstroke.

A slight but constant bias is applied to the film strip 19 at all times by a bias arm 50 acting on a pressure plate 52 registered with the exposure aperture 12. The bias arm 50 is mounted for rotation about a screw 54 and is angularly biased in the counter-clockwise direction by a torsion spring 56.

In accordance with an invention of mine disclosed and claimed in U.S. Pat. No. 3,479,114, the pressure plate 52 carries a pressure-transmitting insert 58 preferably comprising a block of stainless steel having an extremely smooth pressure-transmitting surface projecting from the forward plane of the pressure plate 52 for engagement with the film strip 19. The pressure-transmitting area on the insert 58 is substantially coextensive with the exposed area of strip 19.

By the said patented invention, an intermittently acting pressure mechanism imparts a firm, positive pressure on the pressure-transmitting insert 58 during exposure of the film strip 19; that is, except during the film advance interval. The intermittent pressure mechanism comprises a spring arm 60 mounted for rotation about a pin 62. A spring 64 provides a torsional force on the spring arm 60 which is considerably greater than the slight bias applied by the torsion spring 56 on the bias arm 50. The angular force generated by the spring 64 is imparted to the pressure plate 52 through an adjustable screw 66 engaging the rear surface of the insert 58. By this arrangement, an area of the film strip 19 substantially coextensive with the area being exposed is pressed by the pressure transmitting surface of the insert 58 into firm, positive, and intimate engagement with the rear surface of a color-encoding filter 67 mounted on a holder 69 (to be discussed in detail below), thus minimizing the filter-to-film spacing during exposure of the film strip 19. A pair of pins 68 and 70, extending from the pressure plate 52, are received in a pair of conforming openings 72 and 74 in the spring arm 60 to stabilize the pressure plate 52 while allowing it to move axially.

In order that the pressure applied on the insert 58 by the spring arm 60 may be released throughout the interval during which the film is advanced, the spring arm 60 is provided with an extension 76 having an arcuate cam follower 78 thereon located in registration with the locus of travel of the tip of the claw 40 on the claw member 22. In operation, as the claw 40 penetrates one of the perforations 42 in the film strip 19 to begin a film advance stroke, the tip of the claw 40 engages the acting surface of the cam follower 78, impelling the spring arm 60 in a direction away from the film strip and against the torsional force exerted by spring 64; thus, the pressure exerted by the spring arm 60 is totally relieved between exposure intervals as the film strip 19 is advanced.

In accordance with this invention, there is provided a removable holder 69 mounting two light-affecting elements. One of the light-affecting elements is a color-encoding filter 67 and the other is, in the preferred illustrated embodiment, a neutral glass element 80. Although not necessary to an understanding of this invention, the filter 67 may take the form of a neutral base supporting one or more colored grids of predetermined spectral absorption characteristic, spatial frequency, and azimuthal orientation. The holder 69 mounts the light-affecting elements in such a way that the elements may be quickly and easily cleaned by a user under operational conditions.

As explained in more detail hereinafter, with the holder 69 in a first of two settings the filter 67 is located in an operative position on the optical axis of the camera objective lens (not shown), enabling color information to be encoded on the black-and-white film strip 19. To convert to conventional black-and-white photography, the holder 69 may be quickly withdrawn from the camera housing, rotated about its longitudinal axis and reinserted into the camera housing. In this alternate position of the holder 69, the neutral element 80 is located on the optical axis and effects a retardation of the image rays equal to that introduced by the color-encoding filter, but has no other effect on the taking operation. Thus, the user may convert between conventional black-and-white photography and non-conventional color storage photography very rapidly and without having to re-adjust the focus of the camera objective.

Turning now to FIGS. 1–3 of the drawings, the holder 69 is illustrated (see particularly FIG. 3) as comprising a metal plate 82 containing at its operative end a pair of like circular recesses on opposite faces thereof, one of which is shown at 84. For reasons which will become apparent from the ensuing discussion, the recesses 84 are disposed in side-by-side relationship equidistant from a longitudinal axis A—A of the holder 69. The neutral element 80 is composed preferably of glass of thickness and index such that its optical retardation characteristic is equal to that of the filter 67, whereby the optical path length from the camera objective to the image plane is the same irrespective of whether conventional black-and-white or non-conventional color storage photography is being performed. The neutral element 80 and the filter 67 are preferably cemented in the respective recesses 84.

In the bottom walls of the recesses 84 are located rectangular apertures 86, 88 which serve as field-defining apertures during exposure. For the purpose of guiding the holder 60 into and out of the camera housing 10 and to support the holder 69 in its proper position in the camera, a guide structure 100 is provided. The guide structure 100 is illustrated as including a channel 102 having outwardly beveled entrance surfaces 104, 106 for cooperation with inwardly beveled surfaces 108, 110 on holder 69. The channel 102 serves to guide the holder into a position wherein one of the light-affecting elements 67, 80 is located on the camera optical axis.

To accurately control the position of the holder in the channel, detent means are provided. The detent means are shown as comprising a pair of spring arms 112, 113, recessed in the side walls of channel 102, having respective fingers 114, 115 which snap into notches 116, 117 in the holder 69 when the holder 69 is in its correct position in the channel 102. When the holder 69 is fully inserted into the camera housing, a registered pair of seals 118, 119, composed preferably of a resilient sponge material, close the channel 102, precluding the entrance of light and dirt into the exposure chamber.

It is important that the light-affecting elements, particularly the filter 67, be accurately positioned along the optical axis as well as transversely thereto. To this end, a forward axial bias is applied against the holder 69 by a loading device 120 including a spring-loaded plunger 122. The loading device 120 is shown as being of a commercially available type having external threads which may be screwed into an internally threaded mount 123 The mount 123 is carried on a bracket 126 which in turn is supported by screws on the guide structure 100 laterally offset from the optical axis. As shown with particular clarity in FIG. 2, the plunger 122 extends into the channel 102 and exerts an axial force on the holder 69 which maintains the holder firmly against the channel forward wall 126.

To convert from one mode of operation to the other, or to clean the light-affecting elements or field aperture, the user merely grasps the holder 69 on the knurled surfaces 127 and withdraws the holder 69 from the housing against the firm frictional forces applied by spring arms 112, 113, loading device 120, and the walls of channel 102. If the removal was for cleaning purposes only, the holder is reinserted into the camera housing in the same attitude it assumed when withdrawn. To convert to the alternate recording mode, the holder is rotated about its longitudinal axis A—A and reinserted into the guide structure 100 until the fingers 114, 115 on the spring arms 112, 113 snap into engagement with the notches 116, 117 in the holder 69.

FIGS. 4–8 illustrate a second embodiment of the invention incorporated in a commercially available camera of a different type than that disclosed in FIGS. 1 and 2. In this embodiment, a pair of alternatively operative light-affecting elements, which likewise may be a glass-based filter 128 and a neutral element 130, are mounted on a holder 132 in tandem fashion in such a way that conversion from a color storage photographic mode to a conventional black-and-white photographic mode is accomplished by removing the holder 132 from the camera housing, rotating it about a normal to the holder (end for end) and reinserting it into the camera housing.

As above, before discussing the subject matter of the invention as incorporated in the FIGS. 4–8 embodiment, the general nature and operation of the camera per se will be described. The camera comprises a front plate 134 defining an exposure opening 136 on the optical axis 0—0 of the camera objective lens (not shown) and supporting for rotation a shutter 138 driven through a spur gear 140 by drive means (not shown). A film advance mechanism for transporting a film strip 142 between supply and storage reels (not shown) is illustrated as including shuttle 144. The shuttle contains a claw 145 which engages perforations 146 in the film strip 142 to effect an intermittent pull-down of the film strip 142. The shuttle is reciprocated vertically by a radial cam 147 operating against cam follower surfaces 148, 149 on the shuttle. Shafts 150, 151 extending vertically from the top and bottom of the shuttle 144 are captured by screws 154, 156 and support the shuttle 144 for precise vertical motion. A spring 158 precludes shuttle chatter.

In order to introduce a reciprocatory axial movement in the claw 145, the shuttle 144 is caused to oscillate by the engagement of a double 180° face cam 160 on the shutter 138 operating against a pair of cam follower buttons 162, 164.

As discussed above, it is extremely important when recording color information through the use of filter 128 to have the filter 128 and the film strip 142 in firm and intimate engagement during exposure. To this end, and in accordance with another of my inventions claimed in the above referenced copending application, means are provided for intermittently pressing the film strip 142 against the light-affecting element on the optical axis (either the filter 128 or the neutral element 130 depending on the mode of operation). This intermittent pressure-inducing means is illustrated as comprising a constant bias plate 166 for applying a slight but constant pressure against the film strip 142 as it passes through the film gate. The plate 166 is carried by a retractable arm 168 and is hinged to rotate about a pin 169.

The constant bias plate 166 carries an insert 170 floating in an opening 172 therein. The insert 170 may be composed, for example, from stainless steel or chrome-plated aluminum. The insert 170 has shoulders 174 which abut side walls 176 of the opening 172 to prevent the insert 170 from passing completely through the plate 166. The insert 170 and the plate 166 are dimensioned such that the forward operative surface of the insert 170 extends slightly beyond the forward surface of the plate 166, for example, 0.008 – 0.010 inch, when it is in its forwardmost position in the opening 172.

A leaf spring 180 exerts a firm bias against the back face 182 of the insert 170 when the arm 168 is in its forward operable setting. The spring 180 is attached to the arm 168 by a pair of screws, one of which is shown at 184.

The intermittent pressure means operates as follows. At the start of the film pull-down stroke, the claw 145 on shuttle 144 is impelled rearwardly through a perforation 146 in the film strip 142 by the action of cam 160. As the claw 145 is driven downwardly by the cam 147 acting on shuttle 144, the claw 145 engages the constant bias plate 166 and forces it away from the film strip 142. The insert 170 is carried by the plate 166 away from the film strip 142, relieving the pressure exerted thereon by the insert 170. At the end of the pull-down stroke claw 145 retracts from the engaged perforation, allowing the plate 166 to pivot forwardly and the insert 170 under the influence of leaf spring 180 to again reapply a firm pressure of the film strip 142 against the operative light-affecting element. After exposure of the film strip 142, the cycle is repeated.

I shall now discuss the subject matter of this invention as incorporated in the FIGS. 4–8 embodiment. Holder 132 is illustrated as being fabricated from metal stock and contains a pair of recesses 186, 188 arranged along the longitudinal axis of the holder 132. The recesses 186, 188 receive light-affecting elements, here shown as filter 128 and neutral element 130. As in the FIGS. 1–3 embodiment, rectangular openings 190, 192 in the bottom walls of the recesses 186, 188 act as field-defining apertures.

In order to guide the holder through the camera housing, a guide structure 194 is provided. The guide structure 194 defines a channel for receiving the holder 132.

The holder 132 contains a pair of notches, one of which is shown at 196, forming part of detent means for positioning and locking the holder in the proper position in the camera. The mating male portion of the detent means comprises a spring arm 198 mounted on a bracket 200 and having a finger 202 which snaps into one or the other of notches 196 when the holder 132 is in its proper position in the guide structure 194.

To convert from one recording mode to the other, or to remove the light-affecting elements for cleaning, the user merely grasps the protruding manually engageable tab 204 (see especially FIG. 6) and withdraws the holder 132 from the camera. If it is desired to convert to the alternate mode of recording, the holder 132 is rotated about a normal thereto and the opposite end reinserted into the guide structure 194 until the spring arm 198 engages the appropriate notch 194 in the holder 132.

In each of the above-described embodiments, the holder is described as mounting a neutral element and a color-encoding filter element having the same optical retardation characteristic. It is within the scope of this invention to provide on the same holder two filter elements having different spectral, spatial, or other optical characteristic. A number of holders containing light-affecting elements having varied properties or different aperture sizes, may be prepared for elective use under a wide variety of operating photographic conditions.

The invention is not limited to the particular details of construction of the embodiments depicted, and it is contemplated that various and other modifications and applications will occur to those skilled in the art.

Therefore, because certain changes may be made in the above-described process without departing from the true spirit and scope of the invention herein involved, it is intended that the subject matter of the above depiction shall be interpreted as illustrative and not in a limiting sense.

What is claimed is:

1. In a cinematographic camera having an optical axis and means for effecting an intermittent exposure of a strip of photographic film at a film exposure location on said axis, the combination comprising:
   means for guiding said film strip along a predetermined plane through said exposure location;
   a removable holder supporting a light-affecting element having a planar surface; and
   guide means for guiding said holder through a housing for the camera from a withdrawn position to an inserted position wherein said light-affecting element is operatively disposed on said axis and forwardly of said film strip with said planar surface thereof lying contiguous to said predetermined plane.

2. In a cinematographic camera having an optical axis and means for effecting an intermittent exposure of a strip of photographic film at a film exposure location on said axis, the combination comprising:
   means for guiding said film strip along a predetermined plane through said exposure location;
   a removable holder supporting a light-affecting element having a planar surface;
   guide means for guiding said holder through a housing for the camera from a withdrawn position to an inserted position wherein said light-affecting element is operatively disposed on said axis and forwardly of said film strip with said planar surface thereof lying contiguous to said predetermined plane; and
   means synchronized with said means for effecting intermittent exposure for pressing said film into firm and intimate contact with said planar surface of said light-affecting element during exposure of said film.

3. In a cinematographic camera having an optical axis and means for effecting an intermittent exposure of a strip of photographic film at a film exposure location on said axis, the combination comprising:
   means for guiding said film strip along a predetermined plane through said exposure location;
   a removable holder supporting two selectively operative light-affecting elements each having a planar surface adapted for engagement with said film strip; and
   guide means for guiding said holder through a housing for the camera from a withdrawn position to an inserted position wherein one of said light-affecting elements is in an operative position on said optical axis forwardly of said film with said planar surface thereof disposed contiguous to said predetermined plane.

4. The apparatus defined by claim 3 wherein said light-affecting elements are mounted side-by-side across a longitudinal axis of the holder but oppositely directed, whereby conversion from one light-affecting element to the other may be effected by a user by removing the holder from the camera, rotating it about said longitudinal axis, and reinserting the holder into the camera.

5. The apparatus defined by claim 3 wherein said light-affecting elements are mounted on opposite ends of the holder and face in the same direction, whereby conversion from one light-affecting element to the other may be effected by removing the holder from the camera, rotating it about an axis normal thereto, and reinserting the holder into the camera.

6. A compatible cinematographic camera for recording on black-and-white photographic film luminous intensity information by conventional means or, alternatively, color information as well as luminous intensity information by non-conventional means, comprising:

means for effecting an intermittent exposure of a photographic film at a film exposure location on a camera optical axis;

means for guiding said film along a predetermined plane through said exposure location;

a removable holder supporting two alternatively operative light-affecting elements each having a planar surface adapted for engagement with said film strip, one of said light-affecting elements constituting a spectral zonal filter and the other being a neutral element having substantially the same optical retardation as said spectral zonal filter;

guide means for guiding said holder through a housing for the camera from a withdrawn position to an inserted position wherein one of said light-affecting elements is in an operative position on said optical axis;

said light-affecting elements being located on said holder and oriented such that at a given time with the holder in its inserted position one, but only one, of said light-affecting elements is positioned on said optical axis forwardly of said film strip and with said planar surface lying contiguous to said predetermined plane, whereby conversion of said camera between color-recording and non-color-recording modes may be effected by removing the holder from the camera, altering its orientation and reinserting it in the camera so as to bring the other light-affecting element into an operative position on the optical axis.

7. The apparatus defined by claim 6 wherein said light-affecting elements are mounted side-by-side across a longitudinal axis of the holder but oppositely directed, whereby conversion from one light-affecting element to the other may be effected by removing the holder from the camera, rotating it about said longitudinal axis, and reinserting the holder into the camera.

8. The apparatus defined by claim 6 wherein said light-affecting elements are mounted on opposite ends of the holder and face in the same direction, whereby conversion from one light-affecting element to the other may be effected by removing the holder from the camera, rotating it about an axis normal thereto, and reinserting the holder into the camera.

9. In a cinematographic camera having an optical axis and means for effecting an intermittent exposure of a strip of photographic film at a film exposure location on said axis, the combination comprising:

means for guiding said film strip along a predetermined plane through said exposure location;

a removable holder supporting two selectively operative light-affecting elements each having a planar surface adapted for engagement with said film strip;

guide means for guiding said holder through a housing for the camera from a withdrawn position to an inserted position wherein one of said light-affecting elements is in an operative position on said optical axis, said light-affecting elements being located on said holder and oriented such that at a given time with the holder in its inserted position one of said light-affecting elements is positioned on said optical axis forwardly of said film strip and with said planar surface lying contiguous to said predetermined plane; and means synchronized with said means for effecting intermittent exposure for pressing said film into firm and intimate contact with said surface of the operative light-affecting element during exposure of said film.

10. The apparatus defined by claim 9 wherein said light-affecting elements are mounted side-by-side across a longitudinal axis of the holder but oppositely directed, whereby conversion from one light-affecting element to the other may be effected by removing the holder from the camera, rotating it about said longitudinal axis, and reinserting the holder into the camera.

11. The apparatus defined by claim 9 wherein said light-affecting elements are mounted on opposite ends of the holder and face in the same direction, whereby conversion from one light-affecting element to the other may be effected by removing the holder from the camera, rotating it about an axis normal thereto, and reinserting the holder into the camera.

* * * * *